(12) United States Patent
Lee et al.

(10) Patent No.: US 10,762,507 B2
(45) Date of Patent: Sep. 1, 2020

(54) MOBILE TERMINAL AND CONTROLLING METHOD THEREOF

(71) Applicant: LG ELECTRONICS INC., Seoul (KR)

(72) Inventors: Sookyeong Lee, Seoul (KR); Jeongyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 15/833,910

(22) Filed: Dec. 6, 2017

(65) Prior Publication Data

US 2018/0240122 A1    Aug. 23, 2018

(30) Foreign Application Priority Data

Feb. 17, 2017    (KR) .................... 10-2017-0021379

(51) Int. Cl.
*G06Q 20/40* (2012.01)
*G06Q 20/34* (2012.01)
*H04M 1/725* (2006.01)
*G06Q 20/32* (2012.01)

(52) U.S. Cl.
CPC ..... *G06Q 20/40145* (2013.01); *G06Q 20/322* (2013.01); *G06Q 20/3227* (2013.01); *G06Q 20/3563* (2013.01); *H04M 1/72522* (2013.01); *H04M 1/72569* (2013.01); *H04M 2250/12* (2013.01); *H04M 2250/22* (2013.01)

(58) Field of Classification Search
CPC ..... G06Q 20/00; G06Q 20/322; G06Q 20/327
USPC .......................................................... 705/44
See application file for complete search history.

(56) References Cited

U.S. PATENT DOCUMENTS

| 8,550,339 | B1* | 10/2013 | Newman ................. G07F 19/20 |
| | | | 235/379 |
| 2013/0060687 | A1* | 3/2013 | Bak ........................ G06Q 20/20 |
| | | | 705/41 |
| 2013/0332354 | A1 | 12/2013 | Rhee et al. |
| 2016/0078697 | A1* | 3/2016 | Lee ......................... G07C 9/257 |
| | | | 340/5.53 |

FOREIGN PATENT DOCUMENTS

| KR | 1020140026263 | 3/2014 |
| WO | 2015057320 | 4/2015 |

OTHER PUBLICATIONS

PCT International Application No. PCT/KR2017/005169, Notification of Transmittal of the International Search Report and the Written Opinion of the International Searching Authority, or Declaration dated Nov. 17, 2017, 14 pages.

* cited by examiner

*Primary Examiner* — Robert R Niquette
*Assistant Examiner* — Liz P Nguyen
(74) *Attorney, Agent, or Firm* — Lee, Hong, Degerman, Kang & Waimey

(57) ABSTRACT

The present invention relates to a mobile terminal and controlling method thereof, suitable for making offline payment conveniently without a complicated procedure according to a use mode of the mobile terminal. The present invention includes a touchscreen, a fingerprint sensing unit, a wireless communication unit, and a controller configured to, if sensing a first fingerprint input through the fingerprint sensing unit, control a different function to be executed according to a use mode of the mobile terminal at a timing of sensing the first fingerprint input.

20 Claims, 14 Drawing Sheets

<301>  <302>

<401>  <402>  <403>

MOBILE TERMINAL AND CONTROLLING METHOD THEREOF

CROSS-REFERENCE TO RELATED APPLICATIONS

Pursuant to 35 U.S.C. § 119(a), this application claims the benefit of earlier filing date and right of priority to Korean Application No. 10-2017-0021379, filed on Feb. 17, 2017, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for making offline payment conveniently without a complicated procedure according to a use mode of the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, a user may intend to make offline payment in the course of using a content through a mobile terminal. In this case, it may be inconvenient to output a card image for payment by switching to a home screen in the course of running an application. Even if a payment is made, it may be inconvenient to return to a currently run content through a recently used application list instead of directly returning to the currently run content. To this end, a convenient method of returning to a currently run content after making a payment may be required.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which an offline payment can be conveniently made in a manner of launching a payment application through a fingerprint input in lock mode of the mobile terminal.

Another object of the present invention is to provide a mobile terminal and controlling method thereof, by which an offline payment can be conveniently made in a manner of launching a payment application through a fingerprint input in a state that a running screen of an application is outputted to a touchscreen of the mobile terminal.

Technical tasks obtainable from the present invention are non-limited by the above-mentioned technical tasks. And, other unmentioned technical tasks can be clearly understood from the following description by those having ordinary skill in the technical field to which the present invention pertains.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a touchscreen, a fingerprint sensing unit, a wireless communication unit, and a controller configured to, if sensing a first fingerprint input through the fingerprint sensing unit, control a different function to be executed according to a use mode of the mobile terminal at a timing of sensing the first fingerprint input.

According to another aspect of the present invention, if sensing the first fingerprint input through the fingerprint sensing unit in lock mode, the controller is further configured to enter an unlock mode and is control a payment application to be launched, in response to the first fingerprint input.

According to another aspect of the present invention, the lock mode includes a state that a lock screen is outputted to the touchscreen, a state that the touchscreen is turned off, and a state that the touchscreen is AOD (always on display).

According to another aspect of the present invention, if sensing the first fingerprint input to the fingerprint sensing unit in a state that a home screen is outputted to the touchscreen, the controller is further configured to launch a payment application in response to the first fingerprint input.

According to another aspect of the present invention, the mobile terminal further includes a memory, and the controller is further configured to perform an authentication by comparing fingerprint information extracted from the first fingerprint input with fingerprint information stored in the memory and control the payment application to be launched, in response to the first fingerprint input.

According to another aspect of the present invention, the first fingerprint input includes a touch & swipe input through the fingerprint sensing unit.

According to another aspect of the present invention, if sensing a second fingerprint input through the fingerprint sensing unit, the controller is further configured to perform FIDO (fast identity online) authentication using fingerprint information extracted from the second fingerprint input and send payment information to a payment terminal through the wireless communication unit.

According to another aspect of the present invention, the controller is further configured to output a card image corresponding to a payment card to a running screen of the payment application and send the payment information corresponding to the card image to the payment terminal through the wireless communication unit.

According to another aspect of the present invention, the controller is further configured to output a card image list corresponding to at least one payment card to a running screen of the payment application and send the payment information corresponding to a selected card image to the payment terminal through the wireless communication unit.

According to another aspect of the present invention, the controller is further configured to output the home screen in response to a control input to a back key after completion of a payment.

According to another aspect of the present invention, the controller is further configured to, if sensing the first fingerprint input to the fingerprint sensing unit while a running screen of an application except a payment application is outputted to the touchscreen, launch the payment application in response to the first fingerprint input.

According to another aspect of the present invention, the controller is further configured to, if sensing the first fingerprint input to the fingerprint sensing unit while a running screen of an application except a payment application is outputted to the touchscreen, output a payment guide in a manner that the running screen of the application is overlaid with the payment guide.

According to another aspect of the present invention, if sensing a second fingerprint input through the fingerprint sensing unit, the controller is further configured to perform FIDO (fast identity online) authentication using fingerprint information extracted from the second fingerprint input and send payment information to a payment terminal through the wireless communication unit.

According to another aspect of the present invention, the controller is further configured to output the running screen of the application again in response to a control input to a back key after completion of a payment.

According to another aspect of the present invention, the controller is further configured to, if sensing the first fingerprint input through the fingerprint sensing unit while a running screen of a payment application is outputted, send payment information through the wireless communication unit in response to the first fingerprint input.

According to another aspect of the present invention, the controller is further configured to perform FIDO (fast identity online) authentication using fingerprint information extracted from the first fingerprint input and send payment information extracted from the first fingerprint input to a payment terminal through the wireless communication unit, in response to the first fingerprint input.

According to another aspect of the present invention, the controller is further configured to output the home screen to the touchscreen in response to a control input to a back key after completion of a payment.

According to another aspect of the present invention, the fingerprint sensing unit is mounted on a prescribed region of the touchscreen or provided to a rear surface of the mobile terminal.

According to further aspect of the present invention, the controller is further configured to output a card image to a region corresponding to the fingerprint sensing unit on the touchscreen having a running screen of a payment application outputted thereto.

In another aspect of the present invention, as embodied and broadly described herein, a method of controlling a mobile terminal according to another embodiment of the present invention may include sensing a first fingerprint input through a fingerprint sensing unit and controlling a different function to be executed according to a use mode of the mobile terminal at a timing of sensing the first fingerprint input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
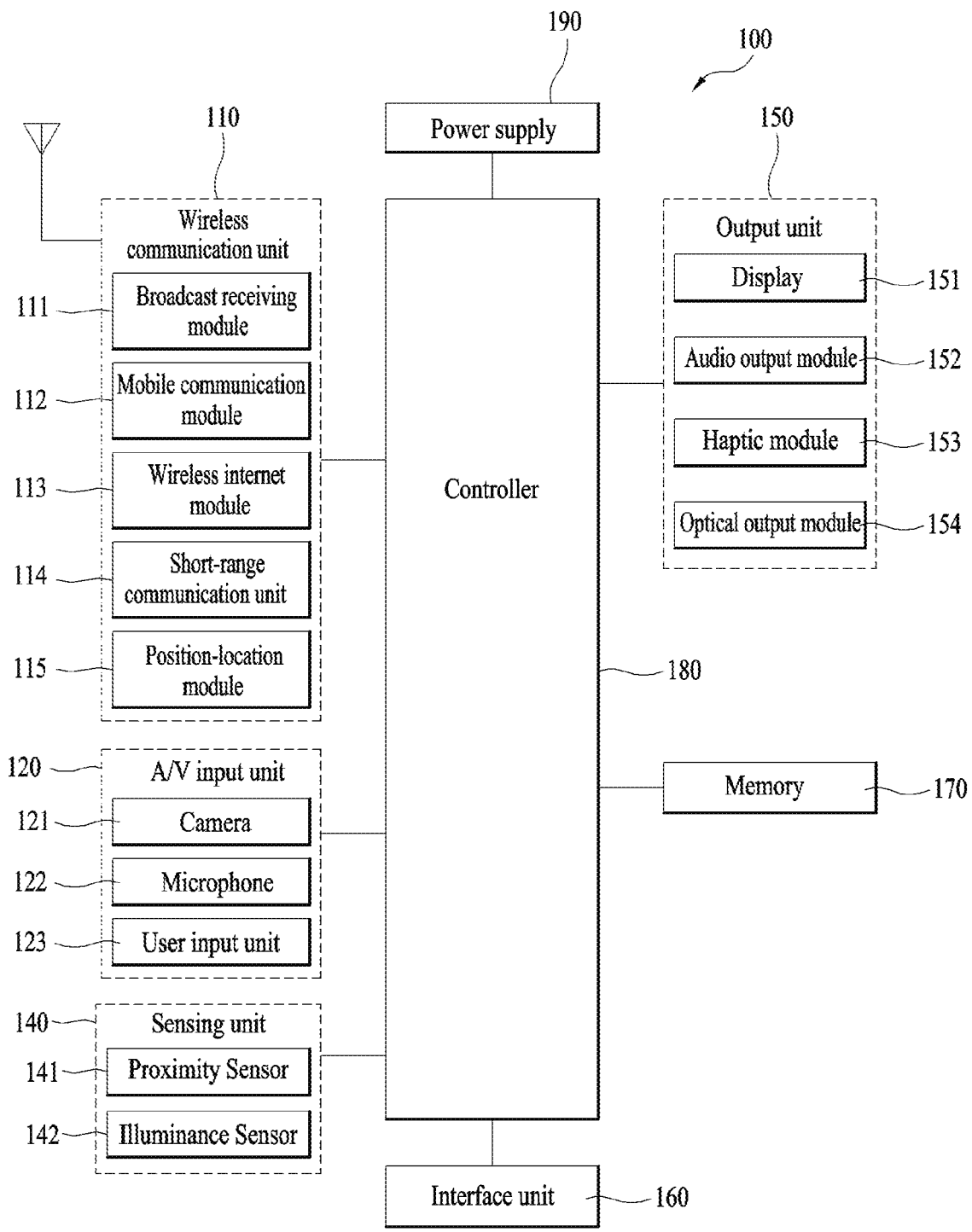
FIG. 1A is a block diagram of a mobile terminal in accordance with the present disclosure.
Figure 1B:
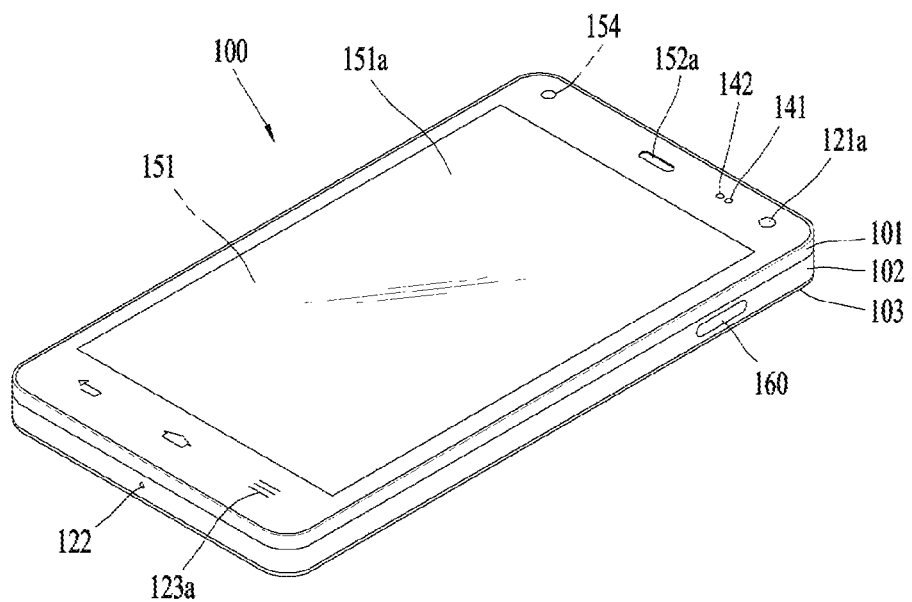
FIGS. 1B and 1C are conceptual views of one example of the mobile terminal, viewed from different directions.
Figure 1C:
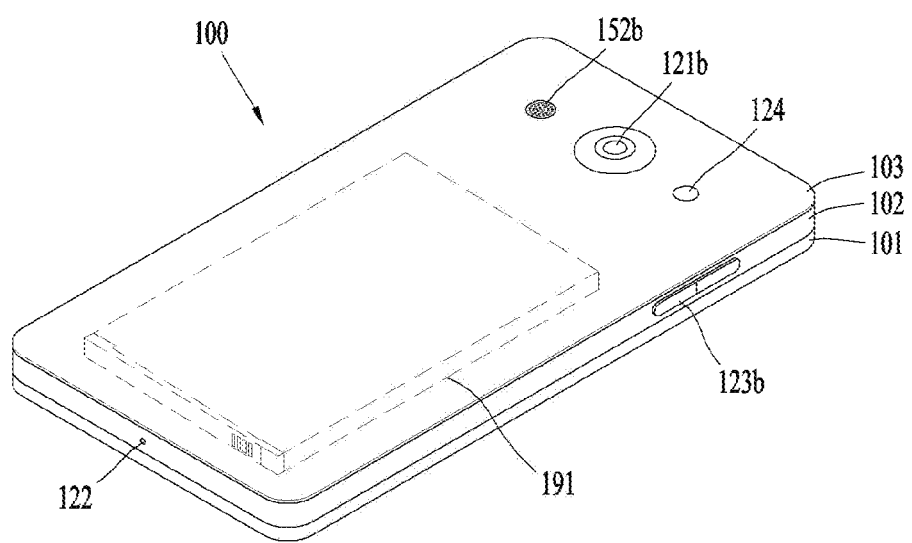

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and informations inputted or outputted through the components mentioned in the foregoing description, or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display 151, the $1^{st}$ audio output unit 152a, the $2^{nd}$ audio output unit 152b, the proximity sensor 141, the illumination sensor 142, the optical output unit 154, the $1^{st}$ camera 121a, the $2^{nd}$ camera 121b, the $1^{st}$ manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
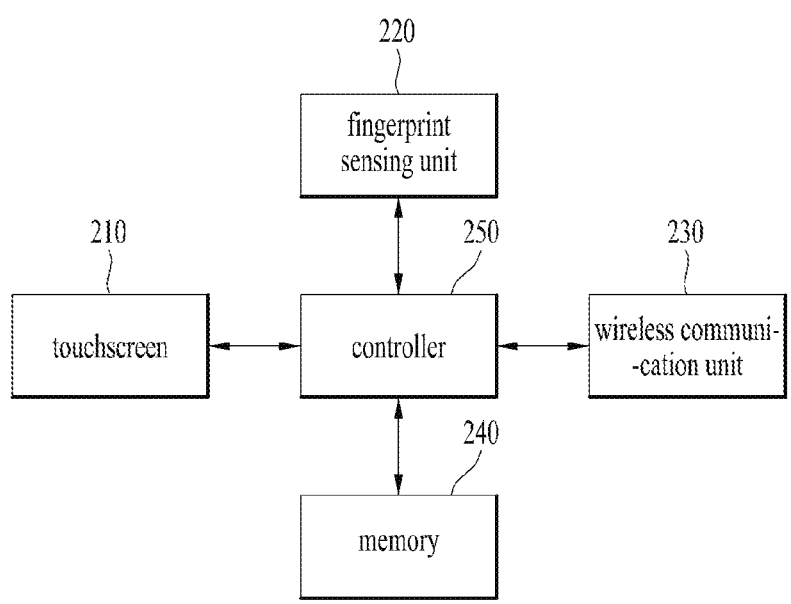
FIG. 2 is a block diagram of a mobile terminal according to one embodiment of the present invention.

FIG. 2 is a block diagram of a mobile terminal according to one embodiment of the present invention.

According to one embodiment of the present invention, a mobile terminal may include a touchscreen 210, a fingerprint sensing unit 220, a wireless communication unit 230, a memory 240 and a controller 250. Moreover, configuration modules included in the mobile terminal is non-limited by the above modules and may further include various configuration modules. Meanwhile, the present invention implemented device is described as a mobile terminal, by which the present invention is non-limited. And, such a device may include one of various display devices, each of which is provided with a touchscreen and a fingerprint sensing unit.

The touchscreen 210 may display visual information. In this case, the visual information may include content, application, image, video, icon, and the like. And, the touchscreen 210 may display information processed by the mobile terminal. For instance, the touchscreen 210 may basically outputs various images and text information and also display UI (user interface) and GUI (graphic user interface) according to a running screen of an application program run in the mobile terminal. Moreover, the touchscreen 210 can output visual information based on a control command of the controller 250.

According to the present invention, the touchscreen 210 may be embodied as the former display 151 provided with the sensing unit 140 or the input unit 120 shown in FIG. 1A. According to one embodiment of the present invention, the touchscreen 210 may output a lock screen, a home screen and a running screen of an application and sense user's control input.

The fingerprint sensing unit 220 may be provided with a fingerprint recognition sensor for recognizing user's fingerprint, and the controller 250 can use fingerprint information sensed through the fingerprint recognition sensor as an authentication means. According to the present invention, the fingerprint sensing unit 220 may be embedded in the touchscreen 210 or a rear button (or a rear touchpad). The fingerprint sensing unit 220 shall be described in detail with reference to FIG. 3 later.

The wireless communication unit 230 may include at least one communication module for communication between the mobile terminal and a payment terminal. For instance, the mobile terminal can perform communication with at least one of an NFC payment terminal, a Bluetooth payment terminal (e.g., BLE (Bluetooth Low Energy) payment terminal, and a magnetic payment terminal. In order to communicate with at least one of the NFC payment terminal, the Bluetooth payment terminal, and the magnetic payment terminal, the mobile terminal may include at least one of an NFC module, a Bluetooth module, and a magnetic communication module.

The NFC module is configured to communicate with the NFC payment terminal using the NFC technology. For example, a mode of the NFC module of the mobile terminal is set to a card emulation mode and a mode of the NFC payment terminal is set to a reader mode, whereby the NFC payment terminal can obtain card information registered at the mobile terminal from the NFC module of the mobile terminal. For another example, both of the NFC module and the NFC payment terminal are set to P2P mode and may perform mutual communication.

The Bluetooth module is configured to communicate with the Bluetooth payment terminal using the Bluetooth technology. For example, if the Bluetooth module of the mobile terminal receives a beacon signal from the Bluetooth payment terminal, it is able to establish association with the payment terminal based on the received beacon signal. Thereafter, the mobile terminal may send the card information registered at the mobile terminal to the Bluetooth payment terminal through the Bluetooth module.

The magnetic communication module is configured to communicate with a payment terminal (i.e., a magnetic payment terminal) having a magnetic reader. If a card desired to be used is selected, the mobile terminal may broadcast card information of the selected cart through the magnetic communication module. The magnetic payment module listens to data broadcasted by the mobile terminal so that a payment can be progressed between the mobile terminal and the magnetic payment module.

The memory 240 can store data related to operations performed in the mobile terminal. For instance, the memory 240 may include a storage medium outside the mobile terminal as well as a storage medium provided to the mobile terminal. According to the present invention, the memory 240 can be embodied as the former memory 170 shown in FIG. 1A. According to one embodiment of the present invention, the memory 240 can store fingerprint information for authentication of the mobile terminal.

The controller 250 may process data, control the respective units of the mobile terminal, and control data transmissions/receptions between the units. According to the present invention, the controller 250 can be embodied as the former controller 180 shown in FIG. 1A. According to one embodiment of the present invention, the controller 250 can control a payment to be made in response to a control input in a manner of launching a payment application and sending payment information to a payment terminal.

According to one embodiment of the present invention, operations performed by the mobile terminal can be controlled by the controller 250. Yet, for clarity of the following description, such operations shall be described as performed by the mobile terminal in general. Through the embodiments shown in FIGS. 3 to 16, a method of simply making a payment in a mobile terminal shall be described as follows.

Figure 3:
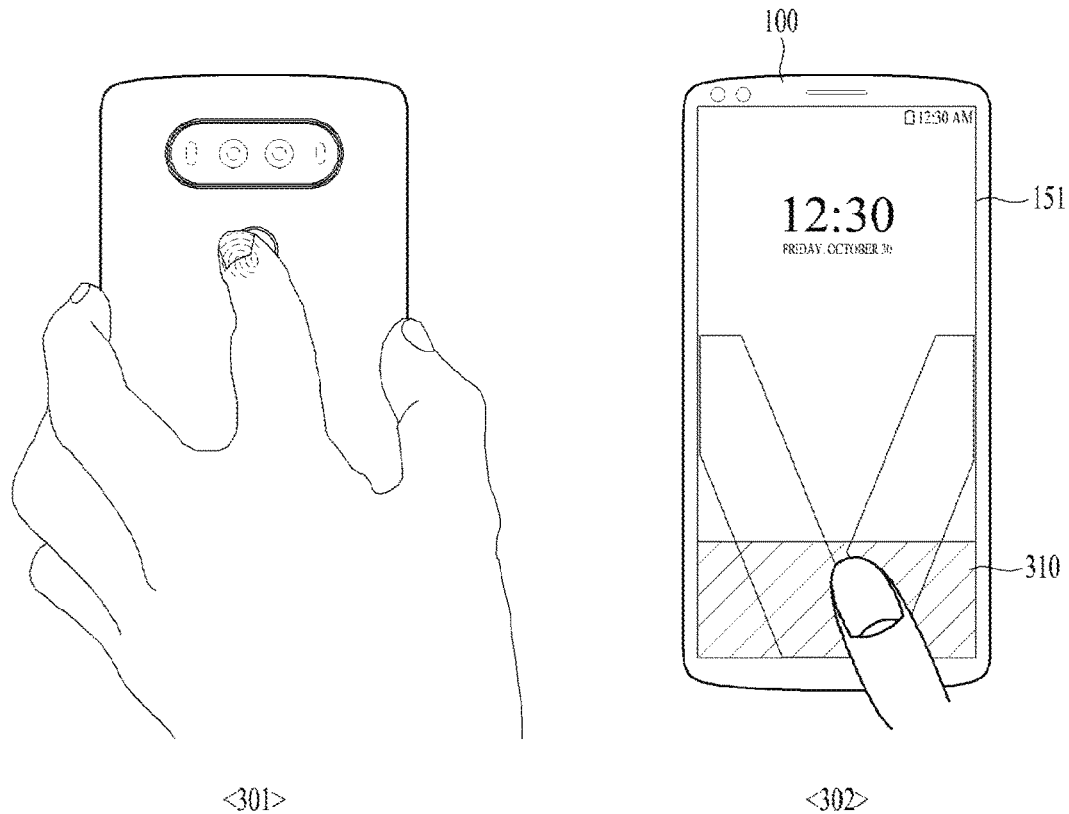
FIG. 3 is a diagram showing one example of a fingerprint sensing unit provided region in a mobile terminal according to one embodiment of the present invention.

FIG. 3 is a diagram showing one example of a fingerprint sensing unit provided region in a mobile terminal according to one embodiment of the present invention.

As described in FIG. 2, the mobile terminal may be provided with the fingerprint sensing unit that may include a fingerprint recognition sensor. The fingerprint recognition sensor may include sensors of various types. For instance, the fingerprint recognition sensor may include an electrostatic fingerprint sensor, an ultrasonic fingerprint sensor, an optical fingerprint sensor, and the like, by which the present invention is non-limited.

The electrostatic fingerprint sensor is a sensor configured to sense and recognize an uneven portion of a user fingerprint and the optical fingerprint sensor corresponds to a sensor configured to recognize a fingerprint shape appearing in visible rays as a pattern by photographing a user's fingerprint photo through a camera. Moreover, the ultrasonic fingerprint sensor is a sensor configured to sense a shape of a ridge on a fingerprint and a shape of a pore 3-dimensionally by detecting a skin surface with ultrasonic waves. The fingerprint recognition sensor of the present invention is assumed as a electrostatic fingerprint sensor, by which the present invention is non-limited.

Meanwhile, in the present invention, the fingerprint sensing unit may be provided to a front or rear surface of the mobile terminal. For example, referring to <301>, the fingerprint sensing unit may be provided to a button or touchpad provided to the rear surface of the mobile terminal. For another example, referring to <302>, the fingerprint sensing unit may be provided to a prescribed region 310 of a front touchscreen of the mobile terminal. In the present invention, in order to perform a payment on the front touchscreen or the rear surface, the mobile terminal may recognize user's fingerprint through the fingerprint sensing unit.

Figure 4:
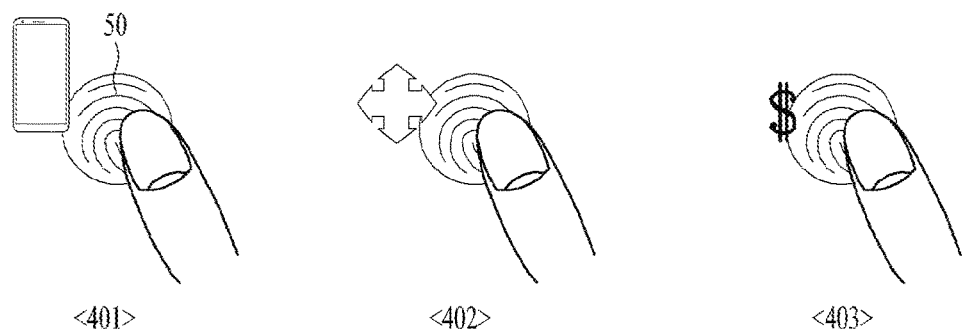
FIG. 4 is a diagram showing one example of a control function of a fingerprint input sensed through a fingerprint sensing unit in a mobile terminal according to one embodiment of the present invention.

FIG. 4 is a diagram showing one example of a control function of a fingerprint input sensed through a fingerprint sensing unit in a mobile terminal according to one embodiment of the present invention.

In the present invention, the mobile terminal may perform a plurality of functions through a fingerprint input. For example, referring to <401>, through a fingerprint input, a local authentication of the mobile terminal can be performed. Herein, the local authentication corresponds to an authentication for an unlock in lock mode of the mobile terminal. The local authentication may be performed by the mobile terminal itself through information stored in the memory without network connection. The lock mode of the mobile terminal may include one of a touchscreen deactivated state, a lock screen outputted state, and a state that AOD (always on display) is outputted to the touchscreen.

For another example, referring to <402>, a direction control input of the mobile terminal can be applied through a fingerprint input. Herein, the direction control input corresponds to a case of recognizing a gesture irrespective of whether fingerprint information is sensed. Namely, the direction control input corresponds to a case of using the fingerprint sensing unit for the usage of sensing a gesture input. For instance, the direction control input may include a 4-way flicking input, a 4-way drag input, a double touch input, a long touch input, or the like. The direction control input to the fingerprint sensing unit may correspond to an input for simply indicating a direction through a swipe input or the like rather than a scroll input of a wide area.

For further example, referring to <403>, payment authentication of the mobile terminal can be performed through a fingerprint input. Herein, the payment authentication corresponds to authentication for performing a payment with a credit card or the like through the mobile terminal. A network connection is necessarily required for the payment authentication, and authentication can be performed through an external server connected to the mobile terminal. For instance, the payment authentication may be performed Fast Identity Online (hereinafter abbreviated FIDO). And, the FIDO corresponds to an authentication scheme that uses a biometric recognition technology in an online environment.

In case of the payment authentication through FIDO, procedures for FIDO registration and FIDO authentication are included. In case of the FIDO registration, first of all, biometric authentication can be performed in a mobile terminal through biometric information (e.g., fingerprint information, iris information, etc.) sensed through an authentication token. The mobile terminal can generate a pair of keys including a private key and a public key using user's biometric information. Herein, the private key is kept in the mobile terminal and the public key and the authentication token can be sent and registered to a server.

In case of the FIDO authentication, in response to user's authentication request, a server can send a challenge value and an authentication token to a mobile terminal. Moreover, a security region in a personal key stored terminal is opened with a registered fingerprint, the challenge value is digitally signed through the personal key, and a result value can be sent to the server. The server verifies the result value sent by the mobile terminal with the public key, thereby completing the authentication. Besides, it is apparent that various methods recognizable by those skilled in the art can apply to FIDO authentication without being limited by the above-mentioned procedure.

According to the following embodiments shown in FIGS. 5 to 16, through a plurality of functions that can be enabled through a fingerprint input, a method of simply making a payment through fingerprint authentication for an offline payment in a mobile terminal is described. Moreover, a fingerprint sensing unit of the present invention is assumed as activated all the time.

Making Payment in Lock Mode or Home Screen Output State

A mobile terminal may include a lock mode and an unlock mode. Herein, the lock mode indicates a state that it is impossible to use contents through the mobile terminal due to the locked mobile terminal. And, the unlock mode indicates a state that it is possible to use contents through the mobile terminal due to the unlocked mobile terminal. In the present invention, the lock mode may include a state that a touchscreen is turned off, a state (AOD, Always On Display) that prescribed information is outputted while the touchscreen is turned off, and a lock screen outputted state. In the present invention, the unlock mode may include a state that a running screen of an application or a home screen is outputted.

Figure 5:
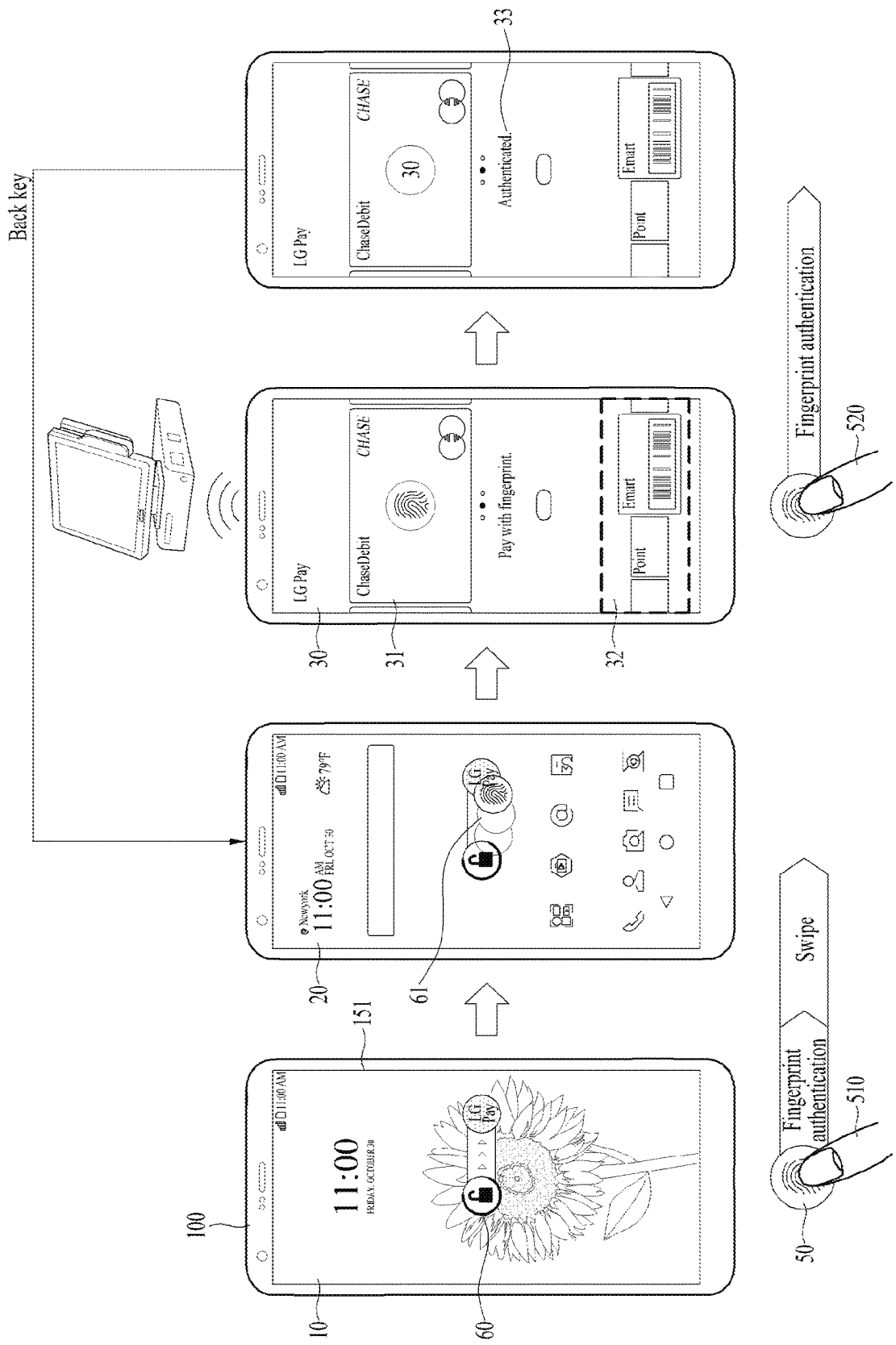
FIG. 5 is a diagram showing one example of making a payment in lock mode of a mobile terminal according to one embodiment of the present invention.

FIG. 5 is a diagram showing one example of making a payment in lock mode of a mobile terminal according to one embodiment of the present invention.

Particularly, the embodiment shown in FIG. 5 assumes that a fingerprint sensing unit 50 of a mobile terminal is provided to a rear surface.

When a lock screen is displayed on a touchscreen, the mobile terminal may control a fingerprint guide 60 to be outputted. The fingerprint guide 60 corresponds to an indicator for executing a specific function through a fingerprint input on the mobile terminal. The fingerprint guide 60 may be changed according to a content currently outputted from the mobile terminal or a use mode. As to the outputted fingerprint guide 60 in FIG. 5, since the fingerprint guide 60 is outputted to the lock screen of the mobile terminal, it may include an icon for unlock and an icon for launching a payment application.

According to the embodiment of FIG. 5, while the lock screen is outputted, the mobile terminal may directly make a payment through two fingerprint authentications. Through the two fingerprint authentications, an unlock, a launch of a payment application and a payment authentication can be completed on the lock screen.

Particularly, referring to a first diagram of FIG. 5, while a lock screen 10 including a fingerprint guide 60 is outputted to a touchscreen, a first fingerprint input 510 may be sensed. A region for outputting the fingerprint guide 60 may correspond to a fingerprint sensing unit provided location of a rear surface. Herein, the first fingerprint input 510 may include a swipe input applied in a prescribed direction to the fingerprint sensing unit.

If the first fingerprint input 510 is sensed, the mobile terminal may perform a fingerprint authentication by comparing the sensed input with fingerprint information stored in the mobile terminal. Through the fingerprint authentication, as shown in a second diagram of FIG. 5, the mobile terminal may release the lock mode and output a home screen. And, the mobile terminal may output an indicator 61 indicating a movement of the first fingerprint input 510. Meanwhile, since the fingerprint authentication through the mobile terminal is instantly performed as soon as the fingerprint input is sensed, the movement of the first fingerprint input 510 may be outputted to the home screen after the fingerprint authentication.

If an end point of the first fingerprint input 510 corresponds to the payment application icon, the mobile terminal may launch the payment application. Referring to a third diagram of FIG. 5, if the payment application is launched, a main card image 31 and at least one available card image 32 may be outputted. In the present invention, since a card list on the payment application is outputted through the fingerprint authentication through the first fingerprint input 510, security can be reinforced in comparison with outputting a card list by simply launching a payment application.

A card image may correspond to an image matching up with a registered card. If a plurality of cards are registered at the mobile terminal, one of a plurality of the registered cards may be set as a main card. The main card may be set by a user, or may be set by the mobile terminal according to a card use frequency, a card use amount, and the like.

In case of sensing a control input (not shown) to one of the at least one or more available card images 32 on the touchscreen, the mobile terminal may output the selected card to replace the main card image 31 [not shown in FIG. 5].

The mobile terminal may have a fingerprint icon included in the main card image 31. The fingerprint icon corresponds to an indicator for guiding a user to a fingerprint authentication for a card payment. While the main card image 31 is outputted, as shown in a third diagram of FIG. 5, a second fingerprint input 520 may be sensed. For instance, while the main card image 31 is outputted, when the mobile terminal is located near a payment terminal, the second fingerprint input 520 can be sensed. Herein, the payment terminal may correspond to one of the magnetic payment terminal, the Bluetooth payment terminal and the NFC payment terminal, described in FIG. 2.

In case of sensing the second fingerprint input 520, the mobile terminal may perform the FIDO authentication by sending fingerprint information to a server and send payment information corresponding to the card image to the payment terminal. If the authentication is completed, as shown in a fourth diagram of FIG. 5, a payment complete message 33 may be outputted. Herein, the numeral outputted to the card image may correspond to a just paid amount, a card limit, a total amount paid for a predetermined period, and the like.

In the payment completed state, the mobile terminal may sense a control input (not shown) to a back key. In this case, the mobile terminal may re-output a home screen outputted in the first place in the unlock state.

According to the embodiment shown in FIG. 5, while the lock screen is outputted to the touchscreen, the payment is made through the fingerprint input. Besides, the same principle may apply to a case that the touchscreen is turned off or a case that the touchscreen includes AOD. As to this case, if the first fingerprint input is sensed, the unlocking may be directly performed without outputting the lock screen separately.

Figure 6:
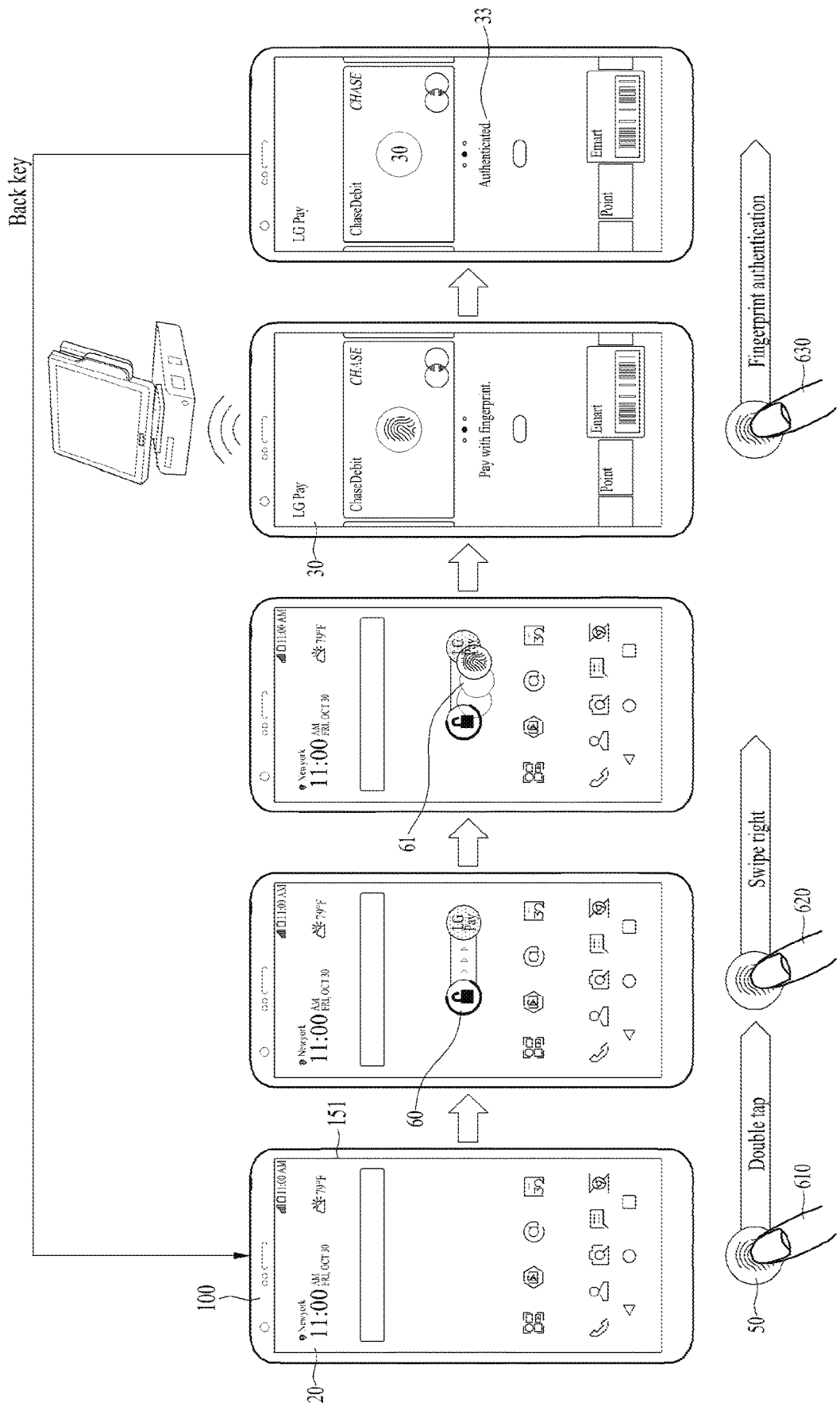
FIG. 6 is a diagram showing another example of making a payment in lock mode of a mobile terminal according to one embodiment of the present invention.

FIG. 6 is a diagram showing another example of making a payment in lock mode of a mobile terminal according to one embodiment of the present invention.

Particularly, the embodiment shown in FIG. 6 assumes that a fingerprint sensing unit 50 of a mobile terminal is provided to a rear surface. Moreover, the embodiment shown in FIG. 6 may correspond to a state that an unlocking is performed through a fingerprint input, a PIN code input or the like in lock mode [not shown in FIG. 6]. In the embodiment shown in FIG. 6, the description of the substance redundant with that of FIG. 5 shall be omitted.

In the embodiment shown in FIG. 6 in a state that a home screen is outputted, the mobile terminal can directly complete a payment through three fingerprint inputs. Namely, through the three fingerprint inputs, a launch of a payment application and a payment authentication can be completed.

In particular, referring to a first diagram of FIG. 6, while a home screen 20 is outputted to the touchscreen, a first fingerprint input 610 may be sensed through the fingerprint sensing unit 50. Herein, the first fingerprint input 610 corresponds to a double tap input.

First of all, in case of sensing the first fingerprint input 610, as shown in a second diagram of FIG. 6, the mobile terminal may output a fingerprint guide 60. Herein, the fingerprint guide 60 may be outputted to a region corresponding to a location of the fingerprint sensing unit provided to the rear surface. And, the fingerprint guide 60 may be outputted in a manner that the home screen is overlaid with the fingerprint guide 60. Or, in order to output the fingerprint guide 60, a location of a prescribed icon is changed on the home screen so that the fingerprint guide 60 may be outputted to the home screen.

While the fingerprint guide 60 is outputted, a second fingerprint input 620 may be sensed. Herein, the second fingerprint input 620 may correspond to a swipe input through the fingerprint sensing unit. The mobile terminal may output an indicator 61 indicating a movement of the second fingerprint input 620. The mobile terminal may perform a fingerprint authentication through fingerprint information sensed from the second fingerprint input 620. If the fingerprint authentication is completed by comparison with fingerprint information stored in the mobile terminal, the mobile terminal may launch a payment application 30.

Referring to a fourth diagram of FIG. 6, if the payment application is launched, a main card image 31 and at least one available card image 32 may be outputted. While the main card image 31 is outputted, a third fingerprint input 630 may be sensed. In case of sensing the third fingerprint input 630, the mobile terminal may perform the FIDO authentication by sending fingerprint information to a server and send payment information to the payment terminal. If the authentication and the payment are completed, as shown in a fifth diagram of FIG. 6, a payment complete message 33 may be outputted.

In the payment completed state, the mobile terminal may sense a control input (not shown) to a back key. In this case, the mobile terminal may re-output a home screen outputted in the first place in the unlock state.

Meanwhile, according to the embodiment shown in FIG. 6, the first fingerprint input 610 and the second fingerprint input 620 are described and illustrated as separate control inputs, respectively. Yet, the first and second fingerprint inputs 610 and 620 may correspond to a single control input applied in a manner of applying a double tap input and then applying a swipe input consecutively.

Figure 7:
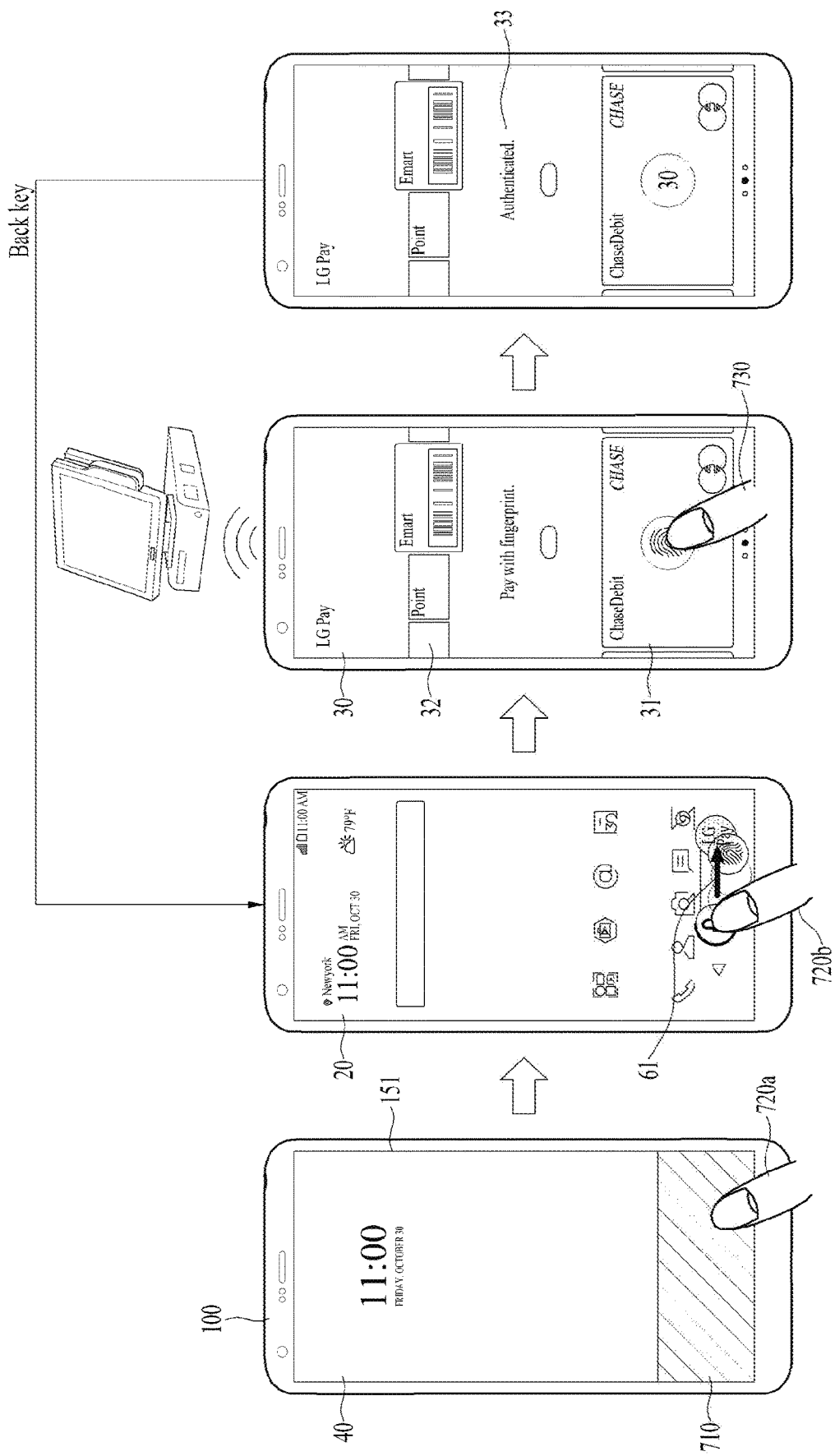
FIG. 7 is a diagram showing further example of making a payment in lock mode of a mobile terminal according to one embodiment of the present invention.

FIG. 7 is a diagram showing further example of making a payment in lock mode of a mobile terminal according to one embodiment of the present invention.

Particularly, the embodiment shown in FIG. 7 assumes that a fingerprint sensing unit 50 of a mobile terminal is provided to a prescribed region of a touchscreen. In the embodiment shown in FIG. 7, the description of the substance redundant with that of FIG. 5 or FIG. 6 shall be omitted.

In the embodiment shown in FIG. 7, the mobile terminal may complete a payment through three fingerprint inputs in AOD state. Namely, through the three fingerprint inputs, a lock mode release, a launch of a payment application and a payment authentication can be completed.

Particularly, referring to a first diagram of FIG. 7, in an AOD outputted state 40, a first fingerprint input 720*a* maybe sensed from a fingerprint sensing region 710. Herein, the first fingerprint input 720*a* may correspond to a single tap input.

In case of sensing the first fingerprint input 720*a*, as shown in a second diagram of FIG. 7, the mobile terminal may output a home screen including a fingerprint guide 60. Herein, unlike the embodiment shown in FIG. 5 or FIG. 6, the fingerprint guide 60 may be outputted to a region corresponding to the fingerprint sensing region 710 of the touchscreen.

While the fingerprint guide 60 is outputted, a second fingerprint input 720*b* may be sensed. Herein, the second fingerprint input 720*b* is a swipe input and corresponds to a consecutive input applied after the first fingerprint input 720*a*. Namely, the first fingerprint input 720*a* and the second fingerprint input 720*b* correspond to a case performed in a manner as follows. First of all, while a single tap is sensed, the home screen 20 is outputted without releasing the touch of the single tap. Secondly, while the home screen 20 is outputted, a swipe input is applied consecutively.

Through fingerprint information sensed from the first fingerprint input 720*a* or the second fingerprint input 720*b*, the mobile terminal may perform a fingerprint authentication. If the fingerprint authentication is completed by comparison with fingerprint information stored in the mobile terminal, the mobile terminal may launch a payment application 30.

Referring to a third diagram of FIG. 7, if the payment application is launched, a main card image 31 and at least one available card image 32 may be outputted. Unlike the embodiment shown in FIG. 5 or FIG. 6, the main card image 31 may be outputted to a region corresponding to the fingerprint sensing region 710. In case of sensing a third fingerprint input 730 in a state that the main card image 31 is outputted, the mobile terminal may perform the FIDO authentication by sending fingerprint information to a server. If the authentication is completed, as shown in a fourth diagram of FIG. 7, a payment complete message 33 may be outputted.

In the payment completed state, the mobile terminal may sense a control input (not shown) to a back key. In this case, the mobile terminal may re-output a home screen outputted in the first place in the unlock state.

Making Payment During Running Application

A user may intend to make a payment in the course of using a content through a mobile terminal. To this end, it may be inconvenient for the user to output a card image for the payment by switching to a home screen in the course of running an application. Even if the payment is completed, it may be also inconvenient to return to a currently running content through a recently used application list instead of returning to the currently running content. To avoid such inconveniences, although a payment is performed in the course of using a content, the present invention intends to provide a method of returning to an originally performed task after making the payment quickly.

Figure 8:
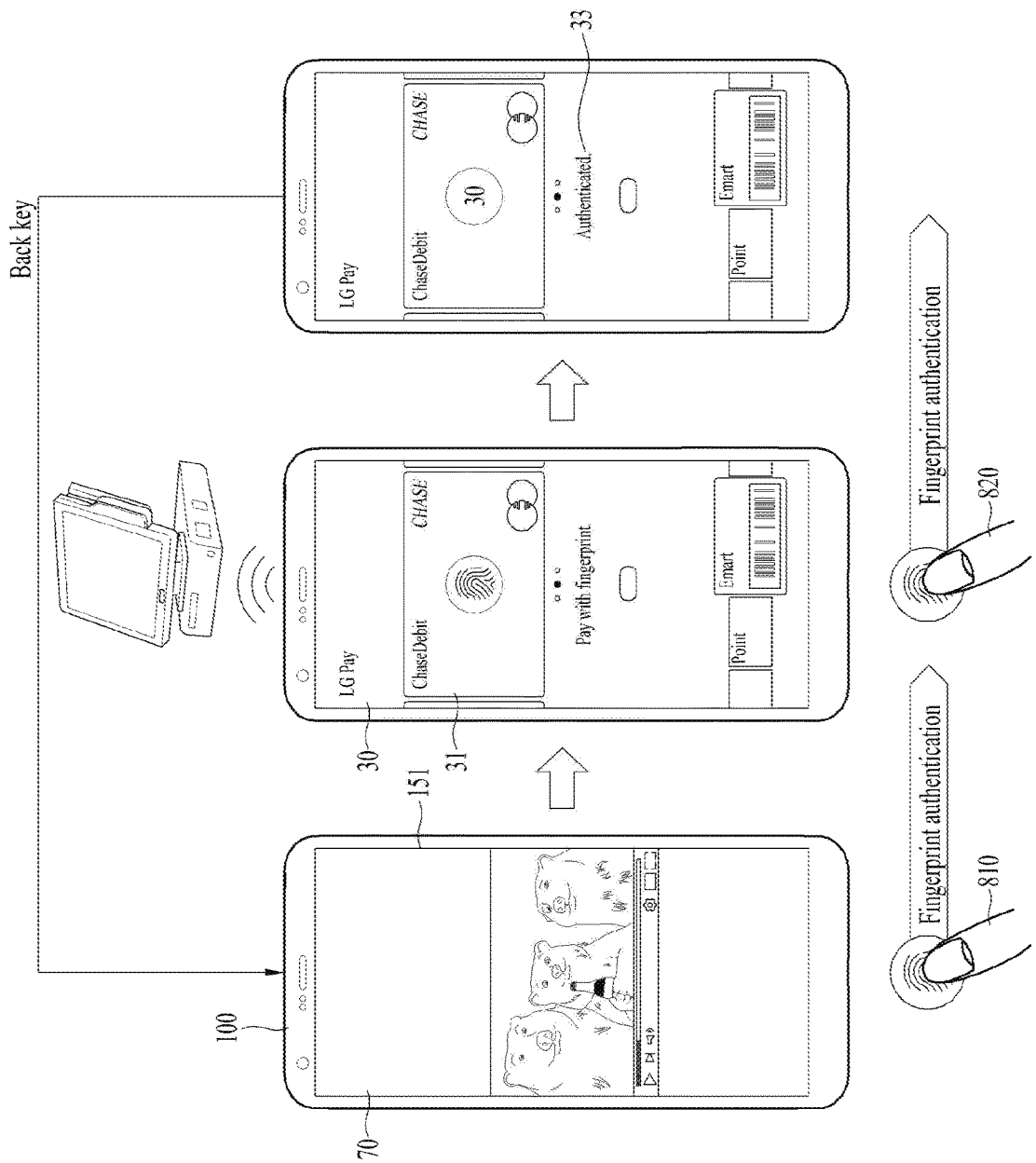
FIG. 8 is a diagram showing one example of making a payment in the course of running an application in a mobile terminal according to one embodiment of the present invention.

FIG. 8 is a diagram showing one example of making a payment in the course of running an application in a mobile terminal according to one embodiment of the present invention.

Particularly, the embodiment shown in FIG. 8 assumes that a fingerprint sensing unit 50 of a mobile terminal is provided to a rear surface.

In the embodiment of FIG. 8, while an application is running, the mobile terminal directly completes a payment through two fingerprint inputs and may return to the currently running application through a back key.

Particularly, referring to a first diagram of FIG. 8, while a running screen 70 of an application is outputted to the touchscreen, a first fingerprint input 810 may be sensed through the fingerprint sensing unit 50. Herein, the first fingerprint input 810 may correspond to a long touch input or a double tap input. In the embodiment of FIG. 8, the currently running application includes a video play application, by which the present invention is non-limited.

If the first fingerprint input 810 is sensed, as shown in a second diagram of FIG. 8, the mobile terminal may launch a payment application 30. Namely, as to the embodiment shown in FIG. 8, despite that any fingerprint guide is not outputted, if a fingerprint input is sensed for a prescribed of time during the currently running application, the payment application 30 can be launched. Moreover, the mobile terminal may stop outputting the running screen of the application and launch the payment application 30. Herein, the sensed fingerprint input may correspond to a case that a fingerprint authentication is completed by comparison with fingerprint information stored in the mobile terminal.

Referring to a second diagram of FIG. 8, if the payment application is launched, a main card image 31 may be outputted to a region corresponding to a location of the fingerprint sensing unit 50 located at the rear surface of the mobile terminal. While the main card image 31 is outputted, the mobile terminal may sense a second fingerprint input 820 through the fingerprint sensing unit 50. Herein, the second fingerprint input 820 may correspond to a short touch input or a long touch input.

In case of sensing a second fingerprint input 820, the mobile terminal may perform the FIDO authentication by sending fingerprint information to a server. And, the mobile terminal may send payment information to the payment terminal together with the fingerprint authentication. If the payment is completed, as shown in a third diagram of FIG. 8, a payment complete message 33 may be outputted.

In the payment completed state, the mobile terminal may sense a control input (not shown) to a back key. In this case, the mobile terminal may re-output the running screen 70 of the existing application running currently.

Figure 9:
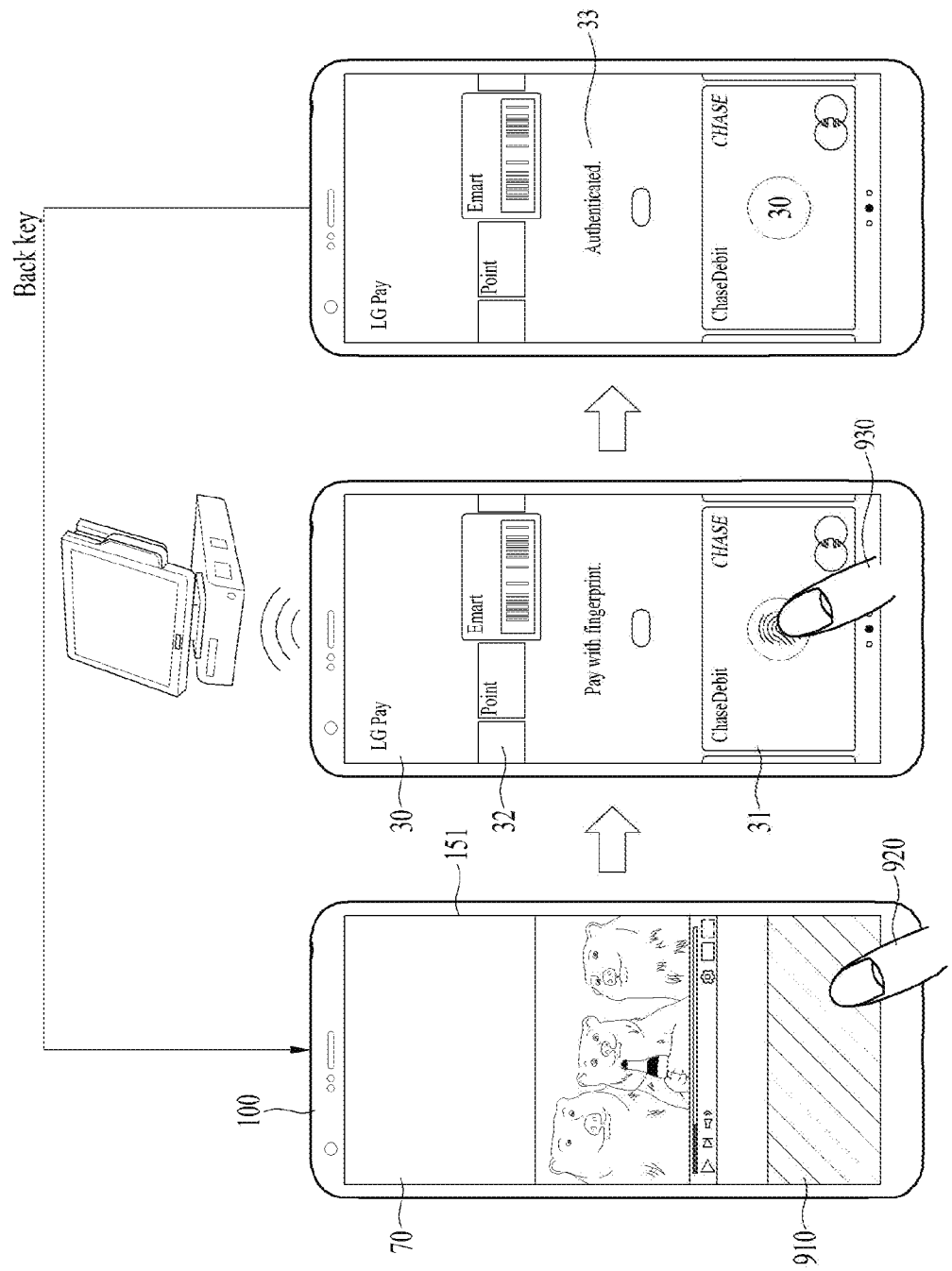
FIG. 9 is a diagram showing another example of making a payment in the course of running an application in a mobile terminal according to one embodiment of the present invention.

FIG. 9 is a diagram showing another example of making a payment in the course of running an application in a mobile terminal according to one embodiment of the present invention.

Particularly, the embodiment shown in FIG. 9 assumes that a fingerprint sensing unit 50 of a mobile terminal is provided together with a touchscreen. In the embodiment shown in FIG. 9, the description of the substance redundant with that of FIG. 5 or FIG. 8 shall be omitted.

In the embodiment of FIG. 9, while an application is running, the mobile terminal completes a payment through two fingerprint inputs and may return to the currently running application through a back key.

Particularly, referring to a first diagram of FIG. 9, while a running screen 70 of an application is outputted to the touchscreen, a first fingerprint input 920 to a fingerprint sensing region 910 corresponding to the fingerprint sensing unit 50 may be sensed. Herein, the first fingerprint input 920 may correspond to a long touch input or a double tap input.

In doing so, while the running screen 70 of the application is outputted to the touchscreen, if the beginning of the long touch input or the double tap input is sensed, the mobile terminal may output a guide indicating the fingerprint sensing region 910 to the touchscreen [not shown in FIG. 9].

If the first fingerprint input 920 is sensed, as shown in a second diagram of FIG. 9, the mobile terminal may launch a payment application 30. Herein, assume that fingerprint information extracted from the first fingerprint input 920 is in a fingerprint authentication completed state in comparison with fingerprint information stored in the mobile terminal.

Referring to the second diagram of FIG. 9, if the payment application is launched, a main card image 31 may be outputted to a location of the fingerprint sensing unit 50 located at the front surface. While the main card image 31 is outputted, the mobile terminal may sense a second fingerprint input 930 through the fingerprint sensing unit 910. Herein, the second fingerprint input 930 may correspond to a short touch input or a long touch input.

In case of sensing the second fingerprint input 930, the mobile terminal may perform the FIDO authentication by sending fingerprint information to a server. And, the mobile terminal may send payment information corresponding to the main card image 31 to a payment terminal located in a close distance. If the authentication is completed, as shown in a third diagram of FIG. 9, a payment complete message 33 may be outputted.

In the payment completed state, the mobile terminal may sense a control input (not shown) to a back key. In this case, the mobile terminal may stop running the payment application and output the screen 70 of the existing application running currently. Moreover, if a video play is stopped and the payment application is running, the mobile terminal may control the video to be resumed from a timing of the stop after the completion of the payment.

Figure 10:
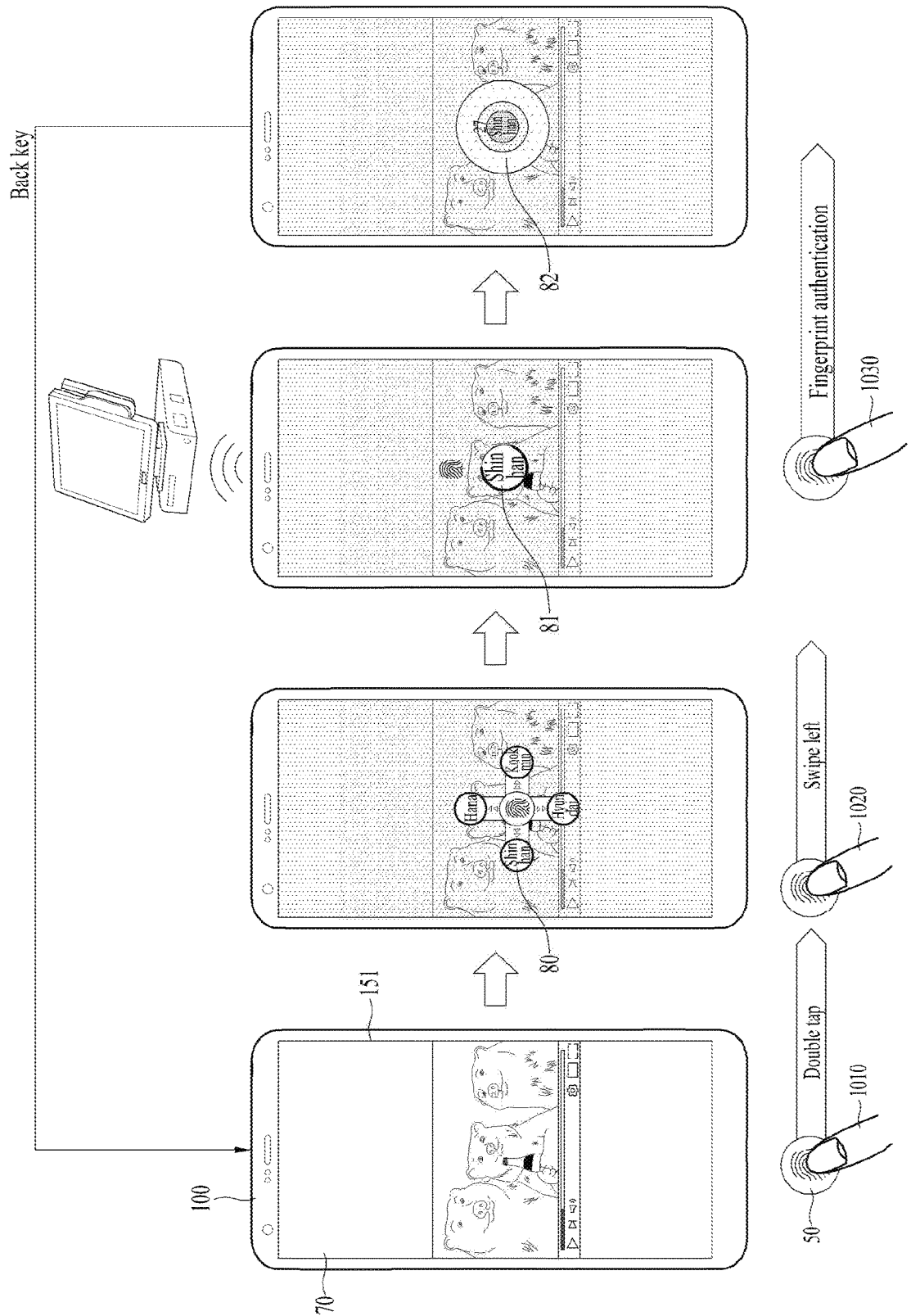
FIG. 10 is a diagram showing further example of making a payment in the course of running an application in a mobile terminal according to one embodiment of the present invention.

FIG. 10 is a diagram showing further example of making a payment in the course of running an application in a mobile terminal according to one embodiment of the present invention.

Particularly, the embodiment shown in FIG. 10 assumes that a fingerprint sensing unit 50 of a mobile terminal is provided to a rear surface. In the embodiment shown in FIG. 10, the description of the substance redundant with that of FIG. 5 or FIG. 8 shall be omitted.

In the embodiment shown in FIG. 10, the mobile terminal may output a payment guide 80 in a manner of overlaying a running screen of an application with the payment guide 80, perform a payment directly, and return to the currently running application through a back key.

Referring to a first diagram of FIG. 10, while a running screen 70 of an application is outputted to the touchscreen, a first fingerprint input 1010 may be sensed through the fingerprint sensing unit 50. Herein, the first fingerprint input 1010 may correspond to a long touch input or a double touch input.

If the first fingerprint input 1010 is sensed, as shown in a second diagram of FIG. 10, the mobile terminal may output a payment guide 80. Namely, in the embodiment shown in FIG. 10, without interrupting the currently running screen, the payment guide 80 can be outputted in a manner of overlaying the currently running application with the payment guide 80. Herein, this corresponds to a case that a fingerprint authentication is completed by comparing fingerprint information extracted from the first fingerprint input 1010 with fingerprint information stored in the mobile terminal.

The payment guide 80 may include a plurality of preset card options. A plurality of the preset card options may be configured in one direction corresponding to 1 card up to maximum four directions corresponding to 4 cards. If a swipe input is sensed in one of the directions of a plurality of the card options by starting with a fingerprint image included in a center of the payment guide is sensed, the corresponding card can be selected for a payment.

If a second fingerprint input 1020 is sensed, as shown in a third diagram of FIG. 10, the mobile terminal may output a selected card option 81 to the running screen 70 by an overlay instead of the payment guide 80. Herein, the second fingerprint input 1020 corresponds to a swipe input. Herein, the swipe input may correspond to a short flicking touch having directivity on the fingerprint sensing unit unlike a drag input. In the embodiment shown in FIG. 10, the first fingerprint input 1010 and the second fingerprint input 1020 are illustrated as separate touch inputs, respectively. Instead, the first fingerprint input 1010 and the second fingerprint input 1020 may correspond to a long touch & swipe input or a double tap & swipe input as a single touch input.

Subsequently, while the selected card option 81 is outputted, the mobile terminal may sense a third fingerprint input 1030 through the fingerprint sensing unit 50. Herein, the third fingerprint input 1030 may correspond to a short touch input or a long touch input.

In case of sensing the third fingerprint input 1030, the mobile terminal may perform the FIDO authentication by sending fingerprint information to a server. And, the mobile terminal may make a payment by sending payment information to a payment terminal located in a close distance. If the authentication is completed, as shown in a third diagram of FIG. 10, a payment complete popup window 82 may be outputted.

In the payment completed state, if sensing a control input (not shown) to a back key, the mobile terminal may re-output the running screen 70 of the stopped application.

Figure 11:
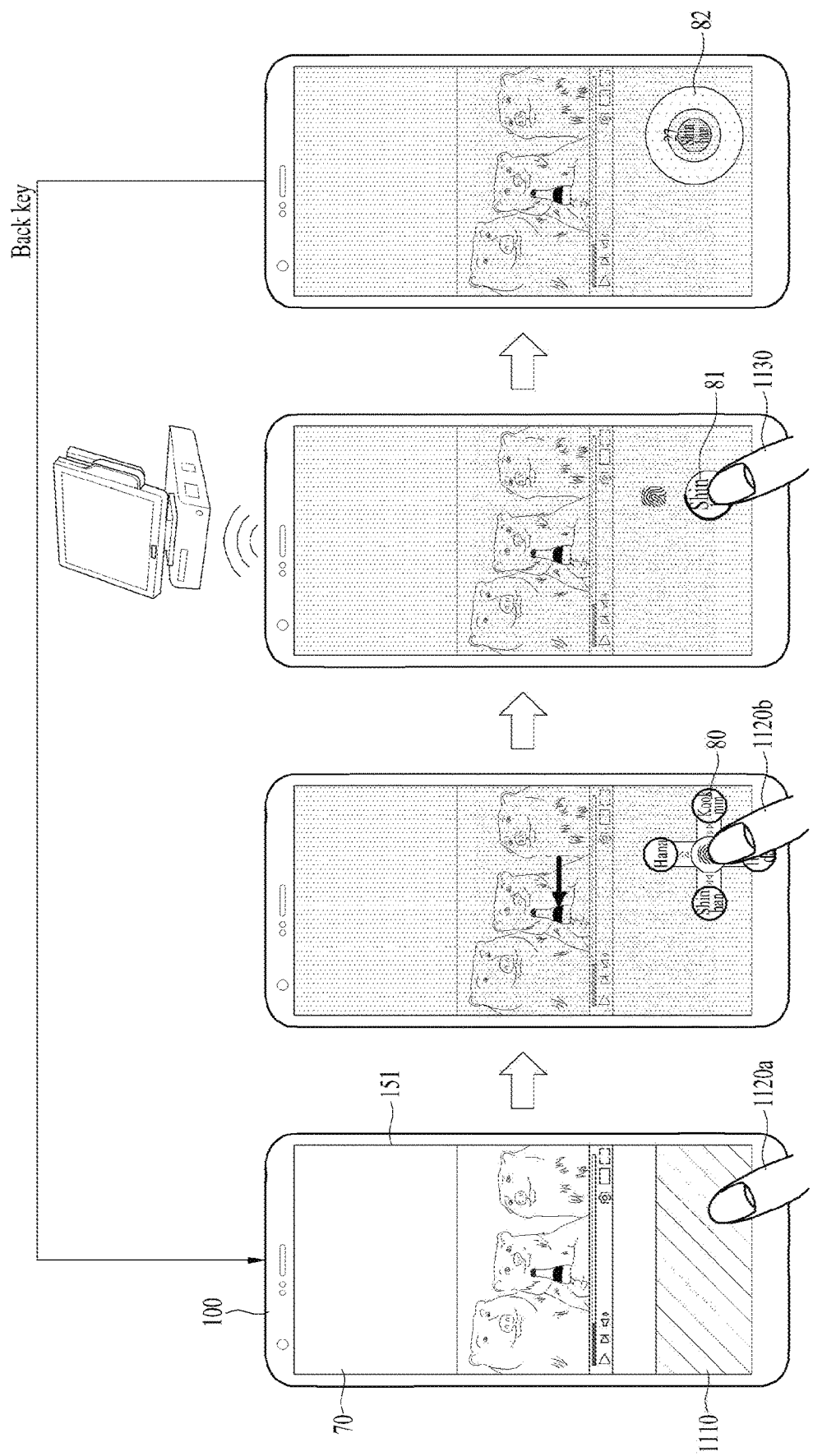
FIG. 11 is a diagram showing another further example of making a payment in the course of running an application in a mobile terminal according to one embodiment of the present invention.

FIG. 11 is a diagram showing another further example of making a payment in the course of running an application in a mobile terminal according to one embodiment of the present invention.

Particularly, the embodiment shown in FIG. 11 assumes that a fingerprint sensing unit 50 of a mobile terminal is provided to a rear surface. In the embodiment shown in FIG. 11, the description of the substance redundant with that of FIG. 5, FIG. 8 or FIG. 10 shall be omitted.

In the embodiment shown in FIG. 11, the mobile terminal may output a payment guide 80 in a manner of overlaying a running screen of an application with the payment guide 80, perform a payment directly, and return to the currently running application through a back key.

Referring to a first diagram of FIG. 11, while a running screen 70 of an application is outputted to the touchscreen, a first fingerprint input 1120*a* to a fingerprint sensing region 1110 may be sensed. Herein, the first fingerprint input 1120*a* may correspond to a long touch input or a double tap touch.

In doing so, while the running screen 70 of the application is outputted to the touchscreen, if the beginning of the long touch input or the double tap input is sensed, the mobile terminal may output a guide indicating the fingerprint sensing region 1110 to the touchscreen [not shown in FIG. 11].

If the first fingerprint input 1120*a* is sensed, as shown in a second diagram of FIG. 11, the mobile terminal may output a payment guide 80. If a second fingerprint input 1120*b* is sensed from the payment guide 80, as shown in a third diagram of FIG. 11, the mobile terminal may output a selected card option 81 by an overlay instead of the payment guide 80. Herein, the second fingerprint input 1120*b* corresponds to a swipe input starting with a fingerprint image on the payment guide 80.

In the embodiment shown in FIG. 11, the first fingerprint input 1120*a* and the second fingerprint input 1120*b* may correspond to a long touch & swipe input or a double tap & swipe input as a single touch input.

Subsequently, while the selected card option 81 is outputted, the mobile terminal may sense a third fingerprint input 1130 from the fingerprint sensing region 1110. Herein, the third fingerprint input 1130 may correspond to a short touch input or a long touch input.

In case of sensing the third fingerprint input 1130, the mobile terminal may perform the FIDO authentication by sending fingerprint information to a server. If the FIDO authentication is completed, the mobile terminal may send payment information to the payment terminal. In this case, as shown in a fourth diagram of FIG. 11, a payment complete popup window 82 may be outputted.

In the payment completed state, if sensing a control input (not shown) to a back key, the mobile terminal may re-output the running screen 70 of the stopped application.

Performing Payment During Running Third Party Application

Figure 12:
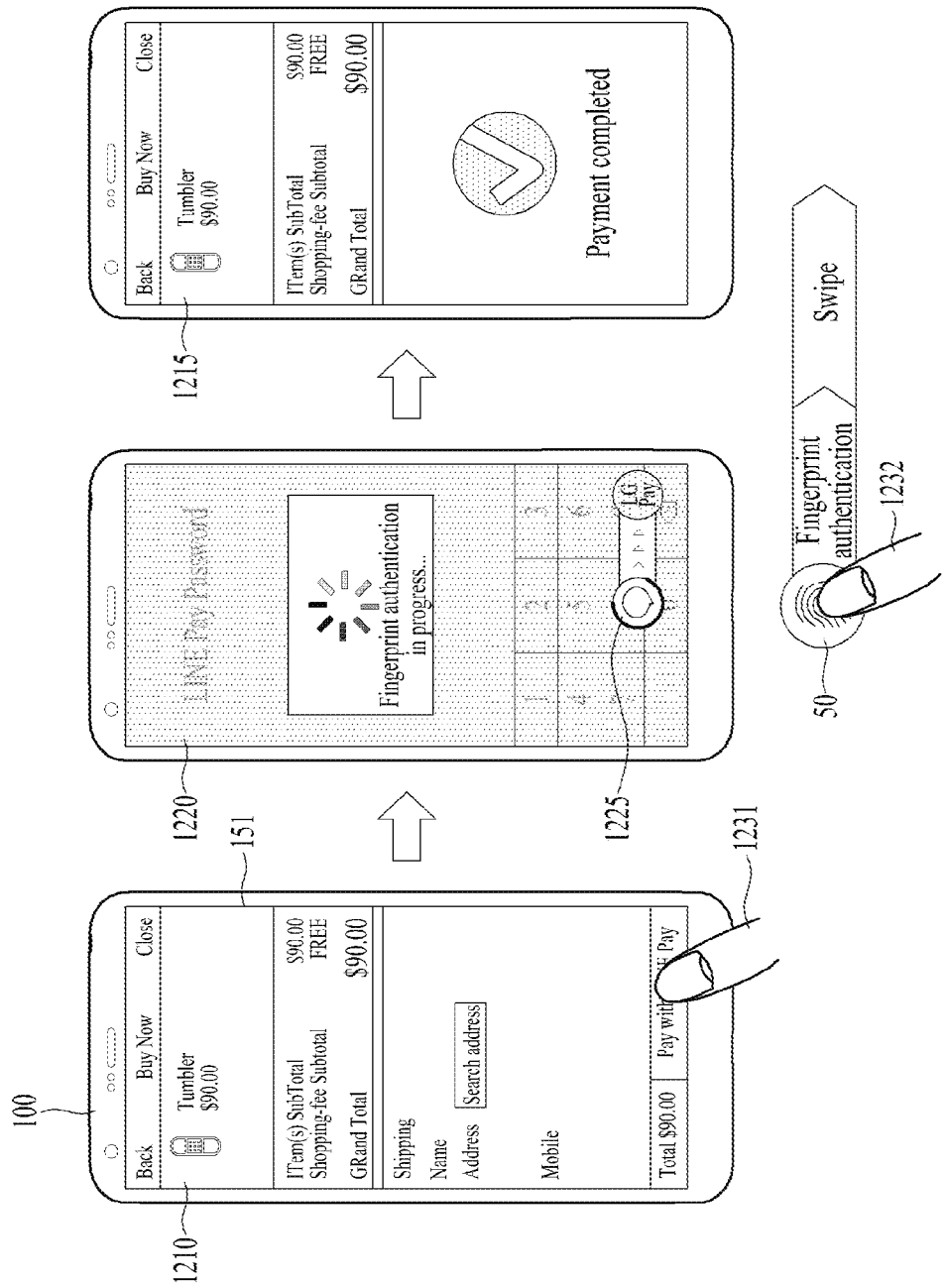
FIG. 12 is a diagram showing one example of making a payment through a third party application in a mobile terminal according to one embodiment of the present invention.

FIG. 12 is a diagram showing one example of making a payment through a third party application in a mobile terminal according to one embodiment of the present invention.

Particularly, the embodiment shown in FIG. 5 shows a method of making a payment quickly through a payment application provided to a mobile terminal in making the payment online through a third party application. In the embodiment shown in FIG. 12, the description of the substance redundant with that of FIG. 5 shall be omitted.

Referring to a first diagram of FIG. 12, the mobile terminal may output a payment screen 1210 of a third party application to the touchscreen. The payment screen 1210 of the third party application may include such information as a payment target item, a payment amount and the like.

The mobile terminal may sense a first control input 1231 to a payment execution region. The first control input 1231 may correspond to one of various touch inputs, as an input not to the fingerprint sensing unit but to the touchscreen.

In this case, the mobile terminal may output a PIN code input screen 1220 or a fingerprint input window for a payment on the third party application. If a prescribed PIN code is inputted to the PIN code input window 1220, an authentication for a server can be completed. Moreover, referring to a second drawing of FIG. 12, while the PIN code input screen 1220 is overlaid with the fingerprint input window, if a registered fingerprint information is inputted through the fingerprint sensing unit 50, since FIDO authentication through the server is completed, a payment can be performed online. Moreover, if the payment is completed, as shown in a third diagram of FIG. 12, a payment complete screen 1215 may be outputted. In doing so, the payment is made with a payment card previously registered on the third party application or a payment card set by a user.

Yet, in this case, the user may desire to make an offline payment through the payment application installed on the mobile terminal as well as the online payment through the third party application.

Namely, as shown in the second diagram of FIG. 12, the mobile terminal may output a fingerprint input guide 1225 on the PIN code input screen 1220 by overlay. Herein, a second control input 1232 to the fingerprint sensing unit 50 may correspond to a swipe input including directivity on the fingerprint sensing unit 50. In response to the second control input 1232, the mobile terminal may make the offline payment for the payment terminal in a manner of launching the payment application and then performing the FIDO authentication through an additional fingerprint input. In this case, the previously performed online payment session through the third party application may be cancelled.

Namely, through the embodiment of FIG. 12, if a plurality of applications for making payment using a fingerprint are redundant with each other, it is able to provide a clear cue as to whether perform an online payment or an offline payment through a fingerprint input.

Figure 13:
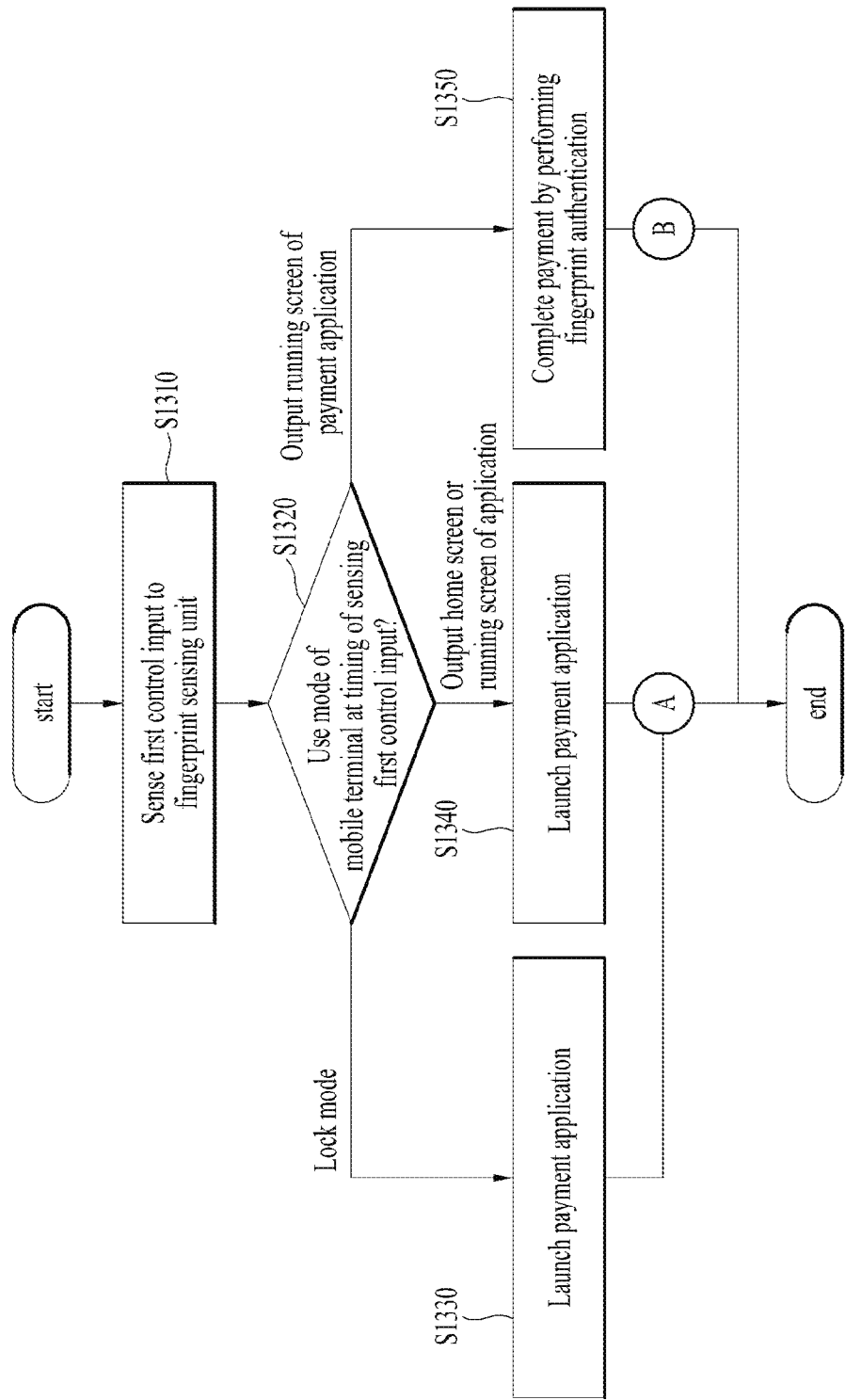
FIG. 13 is a flowchart showing a method of controlling a mobile terminal according to one embodiment of the present invention.

FIG. 13 is a flowchart showing a method of controlling a mobile terminal according to one embodiment of the present invention.

A mobile terminal may sense a first control input to a fingerprint sensing unit [S1310]. Herein, as described in FIG. 3, the fingerprint sensing unit may be mounted on a prescribed region of a front surface of a touchscreen or may be provided to a rear surface of the mobile terminal. And, the first control input corresponds to a fingerprint input.

At a timing of sensing the first control input, the mobile terminal may determine a use mode of the mobile terminal [S1320]. Herein, the mobile terminal may include a lock mode and an unlock mode. According to one embodiment of the present invention, the unlock mode may include a state of currently outputting a home screen or a running screen of an application (except a payment application) or a state of currently outputting a running screen of the payment application.

In case of sensing the first control input in lock mode in the step S1320, the mobile terminal may release the lock mode of the mobile terminal and launch the payment application, in response to the first control input [S1330]. Or, in case of sensing the first control input in the state of outputting a home screen or a running screen of an application (except a payment application) in the step S1320, the mobile terminal may launch the payment application [S1340]. Thereafter, as to a case of additionally sensing a fingerprint input, that will be described with reference to FIG. 14.

Or, in case of sensing the first control input in a state that a running screen of an application is outputted in the step S1320, the mobile terminal may perform a payment through a fingerprint authentication [S1350]. Thereafter, as to a case of additionally sensing a fingerprint input, that will be described with reference to FIG. 15.

Figure 14:
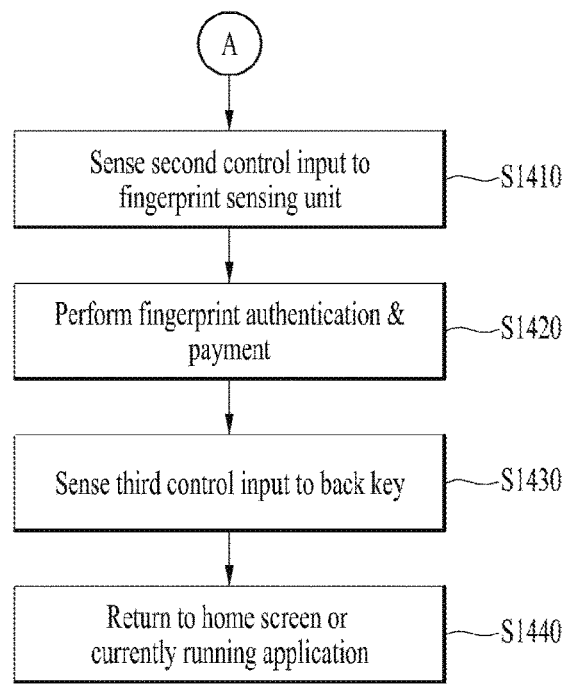
FIG. 14 is a flowchart showing a method of controlling a mobile terminal according to one embodiment of the present invention.

FIG. 14 is a flowchart showing a method of controlling a mobile terminal according to one embodiment of the present invention.

After the step S1340 of FIG. 13, while the home screen is outputted, the mobile terminal may sense a second control input to the fingerprint sensing unit [S1410].

In response to the second control input, the mobile terminal may perform FIDO authentication and send payment information to a payment terminal [S1420].

While the payment is completed, the mobile terminal may sense a third control input to a back key [S1430].

In response to the third control input, the mobile terminal may stop outputting the payment application and output the home screen on a touchscreen [S1440]. Particularly, if a payment application is launched through a fingerprint sensing from the home screen, the mobile terminal returns to the home screen in response to the third control input. Moreover, if a payment application is launched through a fingerprint sensing from a running screen of an application except the payment application, the mobile terminal returns to the running screen of the existing application currently running in response to the third control input.

Figure 15:
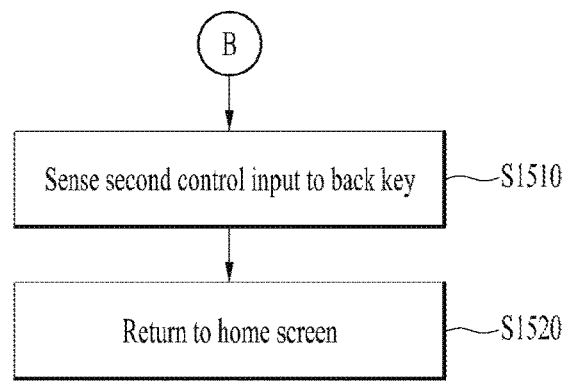
FIG. 15 is a flowchart showing a method of controlling a mobile terminal according to one embodiment of the present invention.

FIG. 15 is a flowchart showing a method of controlling a mobile terminal according to one embodiment of the present invention.

After the step S1350 of FIG. 13, while the payment is completed, the mobile terminal may sense a second control input to the back key [S1510].

In response to the second control input, the mobile terminal may stop outputting the payment application and output the home screen to the touchscreen [S1520].

Furthermore, for clarity, the description is made with reference to each of the divided drawings. Yet, by combining the embodiments described in the respective drawings, it is possible to design a new embodiment to be implemented.

This description of a mobile terminal and controlling method thereof is intended to be illustrative, and not to limit the scope of the claims. The exemplary embodiments described herein may be selectively combined entirely or in part to enable various modifications.

Accordingly, embodiments of the present invention provide various effects and/or features.

According to at least one of embodiments of the present invention, a payment can be quickly progressed in a manner of entering a quick-pay mode in lock mode of a mobile terminal.

According to at least one of embodiments of the present invention, it is able to quickly return to a currently running task through a back key after progressing a payment quickly during the currently running task.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a touchscreen;
a sensor; and
a controller configured to:
execute a first function in response to a first fingerprint input received from the sensor when the mobile terminal is in a first mode at a time when the first fingerprint input is recognized by the controller;
execute a second function in response to the first fingerprint input when the mobile terminal is in a second mode at the time when the first fingerprint input is recognized;
enter an unlock mode and launch a payment application in response to the first fingerprint input when the first fingerprint input is recognized while the mobile terminal is in a lock mode; and
launch the payment application in response to the first fingerprint input when the first fingerprint input is recognized while a home screen is displayed via the touchscreen.

2. The mobile terminal of claim 1, wherein the controller is further configured to cause the touchscreen to display a fingerprint guide on the lock screen.

3. The mobile terminal of claim 2, wherein:
the fingerprint guide comprises a first graphic object indicating the lock mode and located at a first end of the fingerprint guide and a second graphic object indicating the payment application and located at a second end of the fingerprint guide; and
the controller is further configured to enter the unlock mode and launch the payment application when a finger is moved from the first graphic object to the second graphic object on the touchscreen.

4. The mobile terminal of claim 1, wherein the lock mode comprises:
a state in which a lock screen is displayed via the touchscreen;
a state in which the touchscreen is turned off; or
a state in which the touchscreen is AOD (always on display).

5. The mobile terminal of claim 1, further comprising a memory, wherein the controller is further configured to perform an authentication of the first fingerprint input by comparing fingerprint information obtained from the first fingerprint input with fingerprint information stored in the memory.

6. The mobile terminal of claim 1, wherein the first fingerprint input comprises a touch and swipe input applied to the sensor.

7. The mobile terminal of claim 1, further comprising a wireless communication unit, wherein the controller is further configured to perform FIDO (fast identity online) authentication using fingerprint information obtained from a second fingerprint input and cause the wireless communication unit to transmit payment information to a payment terminal in response to the second fingerprint input recognized by the sensor, the second fingerprint input received after the payment application is launched.

8. The mobile terminal of claim 7, wherein the controller is further configured to cause the touchscreen to display a card image corresponding to a payment card while the payment application is executed, the second fingerprint input received while the card image is displayed.

9. The mobile terminal of claim 7, wherein the controller is further configured to:
cause the touchscreen to display a card image list including at least one card image corresponding to at least one payment card while the payment application is executed; and
cause the wireless communication unit to transmit the payment information corresponding to a card image selected from the card image list to the payment terminal.

10. The mobile terminal of claim 7, wherein the controller is further configured to cause the touchscreen to display the home screen in response to a control input received via a back key after completion of a payment associated with the transmitted payment information.

11. The mobile terminal of claim 1, wherein the controller is further configured to launch the payment application in response to the first fingerprint input when the first fingerprint input is recognized by the sensor while an execution screen of an application other than the payment application is displayed via the touchscreen.

12. The mobile terminal of claim 11, further comprising a wireless communication unit, wherein the controller is further configured to:
perform FIDO (fast identity online) authentication using fingerprint information obtained from a second fingerprint input; and
cause the wireless communication unit to transmit payment information to a payment terminal in response to the second fingerprint input recognized by the sensor.

13. The mobile terminal of claim 1, wherein the controller is further configured to cause the touchscreen to display a payment guide in response to the first fingerprint input when the first fingerprint input is recognized by the sensor while an execution screen of an application other than the payment application is displayed via the touchscreen such that the execution screen is overlaid with the payment guide.

14. The mobile terminal of claim 13, wherein the controller is further configured to cause the touchscreen to re-display the execution screen in response to a control input received via a back key after completion of a payment using the payment application.

15. The mobile terminal of claim 1, further comprising a wireless communication unit, wherein the controller is further configured to cause the wireless communication unit to transmit payment information to a payment terminal in response to the first fingerprint input when the first fingerprint input is recognized while an execution screen of the payment application is displayed via the touchscreen.

16. The mobile terminal of claim 15, wherein the controller is further configured to perform FIDO (fast identity online) authentication using fingerprint information obtained from the first fingerprint input.

17. The mobile terminal of claim 16, wherein the controller is further configured to cause the touchscreen to display the home screen in response to a control input received via a back key after completion of a payment associated with the transmitted payment information.

18. The mobile terminal of claim 1, wherein:
the sensor is located on a region of the touchscreen located at a front side of the mobile terminal; or
the sensor is located at a rear side of the mobile terminal.

19. The mobile terminal of claim 18, wherein the controller is further configured to cause the touchscreen to display a card image at a region corresponding to the sensor located on the touchscreen on which an execution screen of the payment application is displayed.

20. A method for controlling a mobile terminal, comprising:
recognizing a fingerprint input received from a sensor of the mobile terminal;
executing a first function in response to the fingerprint input when the mobile terminal is in a first mode at a time when the fingerprint input is recognized;
executing a second function in response to the fingerprint input when the mobile terminal is in a second mode at the time when the fingerprint input is recognized;
entering an unlock mode and launching a payment application in response to the fingerprint input when the fingerprint input is recognized while the mobile terminal is in a lock mode; and
launching the payment application in response to the fingerprint input when the fingerprint input is recognized while a home screen is displayed via a touchscreen of the mobile terminal.

* * * * *